(12) United States Patent
Cho

(10) Patent No.: US 8,682,582 B2
(45) Date of Patent: Mar. 25, 2014

(54) APPARATUS AND METHOD FOR RADIODETERMINATION AND MOBILE TERMINAL USING THE SAME

(75) Inventor: Jeonghoon Cho, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 21 days.

(21) Appl. No.: 13/331,586

(22) Filed: Dec. 20, 2011

(65) Prior Publication Data

US 2012/0158295 A1 Jun. 21, 2012

(30) Foreign Application Priority Data

Dec. 21, 2010 (KR) ........................ 10-2010-0131272

(51) Int. Cl.
*G01S 19/40* (2010.01)

(52) U.S. Cl.
USPC ........................................................ 701/469

(58) Field of Classification Search
USPC ........................................................ 701/469
See application file for complete search history.

(56) References Cited

U.S. PATENT DOCUMENTS

| | | | | |
|---|---|---|---|---|
| 4,445,118 A | * | 4/1984 | Taylor et al. | 342/357.395 |
| 5,359,521 A | * | 10/1994 | Kyrtsos et al. | 701/470 |
| 5,883,594 A | * | 3/1999 | Lau | 342/357.63 |
| 6,266,533 B1 | * | 7/2001 | Zadeh et al. | 455/456.2 |
| 6,389,291 B1 | | 5/2002 | Pande et al. | |
| 2005/0153730 A1 | | 7/2005 | Turetzky et al. | |
| 2006/0014531 A1 | * | 1/2006 | Nam et al. | 455/418 |
| 2008/0248813 A1 | * | 10/2008 | Chatterjee | 455/456.2 |
| 2010/0060514 A1 | * | 3/2010 | Wang et al. | 342/357.1 |
| 2010/0171660 A1 | | 7/2010 | Shyr et al. | |
| 2010/0273504 A1 | * | 10/2010 | Bull et al. | 455/456.1 |
| 2010/0277365 A1 | | 11/2010 | Ha et al. | |

FOREIGN PATENT DOCUMENTS

| | | |
|---|---|---|
| CN | 1976531 A | 6/2007 |
| CN | 101163983 A | 4/2008 |
| CN | 101826220 A | 9/2010 |
| CN | 101883316 A | 11/2010 |
| EP | 2012136 A1 | 1/2009 |
| JP | 2004-507186 A | 3/2004 |
| JP | 2004-235762 A | 8/2004 |
| KR | 10-2005-0122718 A | 12/2005 |

OTHER PUBLICATIONS

Office Action dated May 31, 2013 in Japanese Application No. 2011-280049, filed Dec. 21, 2011.
Office Action dated Mar. 5, 2012 in Korean Application No. 10-2010-0131272, Dec. 21, 2010.
Office Action dated Aug. 14, 2013 in Chinese Application No. 201110429674.X, filed Dec. 20, 2011.

* cited by examiner

*Primary Examiner* — Thomas Tarcza
*Assistant Examiner* — Alex C Dunn
(74) *Attorney, Agent, or Firm* — Saliwanchik, Lloyd & Eisenschenk

(57) ABSTRACT

Disclosed herein is a radiodetermination technology, a radiodetermination device according to one embodiment of the disclosure comprising a positioning mode determination part and position Information generating part, thereby enhancing accuracy and speed of positioning in a resource-limited mobile terminal environment and also further improving energy efficiency and user conveniences.

15 Claims, 3 Drawing Sheets

APPARATUS AND METHOD FOR RADIODETERMINATION AND MOBILE TERMINAL USING THE SAME

CROSS-REFERENCE TO RELATED APPLICATION

This application claims the benefit under 35 U.S.C. §119 of Korean Patent Application No. 10-2010-0131272, filed Dec., 21, 2010, which is hereby incorporated by reference herein in its entirety.

BACKGROUND OF THE DISCLOSURE

1. Field of the Disclosure

The present disclosure relates to a radiodetermination technology, more particularly to, a radiodetermination apparatus and method configured to enhance accuracy and speed of location measurements and to improve energy efficiency, by applying an adaptive location determination mode in a resource-limitive mobile terminal environment, and a mobile terminal using the same.

2. Description of the Related Art

Concomitant with recent increased penetration rate of mobile communication terminals such as a cellular phone or a PDA, various wireless internet services on mobile communication terminal have been introduced. In particular, Location Based Service (LBS) comes into the spotlight largely due to wide application and convenience. For example, LBS can be applied to various fields and situations such as where adequate actions are needed to a rescue call or a criminal report, when geographic information or traffic update of several regions is needed, when differentiating mobile communication billings based on spots, and when performing distribution control. To realize such a location based service, a PDT (Position Determination Technology), technologies of grasping the position of mobile communication terminals, is necessary.

The radiodetermination technologies include a network based mode using a base station reception signal of a mobile communication network, a handset base mode using a GPS (Global Positioning System) signal receiver mounted to terminals, and a hybrid mode using the above two modes.

However, the network based mode has a problem that a positioning error runs short of accuracy such a degree from 500 meters to several kilometers based on cell size or position determination mode. Also, since a terminal based mode and a hybrid mode use a GPS signal, it is difficult to apply when having a mobile communication environment deteriorated, for example, inclement weather or, located in indoors or a basement. Furthermore, such modes have little consideration of energy efficiencies in resource-limited mobile terminal environments.

BRIEF SUMMARY

Embodiments of the present disclosure are to enhance accuracy and swiftness of position measurements and at the same time to improve energy effectiveness, by applying an adaptive positioning mode in resource-limited mobile terminal environments.

Also, embodiments of the disclosure are to enhance user conveniences by allowing position measurements in various mobile communication environments.

In addition, be ordinary persons skilled in the art, it could be clearly understood that embodiments of the present disclosure can solve the above not mentioned and other technical challenges from the recited below.

A radiodetermination apparatus, according to one embodiment of the disclosure, comprises a PM (Positioning Mode) determination part determining a positioning mode corresponding to a specific situation from positioning modes comprising a stand-alone GPS (Global Positioning System) positioning mode and an AGPS (Assisted GPS) positioning mode, in the case the specific situation occurs; and a PI (Position Information) generating part generating location information by performing a stand-alone GPS positioning for each pre-determined period in the case the determined positioning mode is the stand-alone GPS positioning mode, and generating location information by performing a real time AGPS positioning in the case the determined positioning mode is the AGPS mode.

In one embodiment, the PM determination part determines a positioning mode corresponding to a pre-determined periodic positioning situation as the stand-alone GPS mode in case of the pre-determined periodic positioning situation.

In one embodiment, the PM determination part determines a positioning mode corresponding to a pre-determined real-time positioning situation as the AGPS mode in case of the predetermined real-time positioning situation.

In one embodiment, the radiodetermination apparatus further comprises a GPS signal receiving part receiving a GPS signal from GPS satellites, wherein the PI generating part performs the stand-alone GPS positioning for the period using a received GPS signal.

In one embodiment, the radiodetermination apparatus further comprises a wireless communication part performing communication with a mobile communication system having a PDE (Position Determination Entity), wherein the PI generating part performs the AGPS positioning in real-time using data of the PDE received via the wireless communication part.

In one embodiment, the AGPS positioning performed by the PI generating part is an MS assisted GPS positioning or an MS based GPS positioning.

A radiodetermination apparatus, according to another embodiment of the present disclosure, comprises a PM determination part determining a positioning mode corresponding to a specific situation from positioning modes of a Cell ID positioning mode, a stand-alone GPS positioning mode and an AGPS positioning mode, in the case the specific situation occurs; and a PI generating part generating location information by performing a cell ID positioning for a predetermined first period or in real-time in the case of the cell ID positioning mode, generating location information by performing a stand-alone GPS positioning for a predetermined second period in the case of the stand-alone GPS positioning mode, and generating location information by performing a real-time AGPS positioning in the case of the AGPS positioning mode.

In one embodiment, the radiodetermination apparatus further comprises a GPS signal receiving part receiving a GPS signal from GPS satellites, wherein the PM determination part determines a positioning mode corresponding to a failure situation as the cell ID positioning mode in the case of a failure situation of GPS signal reception by the GPS signal reception part.

In one embodiment, the radiodetermination apparatus further comprises a wireless communication part performing communication with a mobile communication system having an MPC (Mobile Positioning Center), wherein the PM determination part determines the cell ID positioning mode as a periodic cell ID positioning mode in the case of a predefined periodic positioning situation in the cell ID positioning mode state, and the PI generating part performs the cell ID positioning for the first period using data of the MPC received via the wireless communication part.

In one embodiment, the PM determination part determines the cell ID positioning mode as a real-time cell ID positioning mode in the case of a predefined real-time positioning situation in the cell ID positioning mode state, and the PI generating part performs the cell ID positioning in real-time using data of the MPC received via the wireless communication part.

In one embodiment, the PM determination part determines a positioning mode corresponding to the periodic positioning situation as the stand-alone GPS positioning mode in the case of the predefined periodic positioning situation.

In one embodiment, the PM determination part determines a positioning mode corresponding to the real-time positioning situation as the AGPS positioning mode in the case of the predefined real-time positioning situation.

In one embodiment, the radiodetermination apparatus further comprises a GPS signal receiving part receiving a GPS signal from GPS satellites, wherein the PI generating part performs the stand-alone GPS positioning using the received GPS signal.

In one embodiment, the radiodetermination apparatus further comprises a wireless communication part performing communication with a mobile communication system having a PDE, wherein the PI generating part performs the AGPS positioning in real-time using data of the PDE received via the wireless communication part.

In one embodiment, the AGPS positioning performed by the PI generating part is an MS assisted GPS positioning or an MS based GPS positioning.

A mobile terminal performing a radiodetermination, according to another embodiment of the present disclosure, comprises a radiodetermination device performing a stand-alone GPS positioning for a predetermined period in the case of a predetermined periodic positioning situation and performing a real-time AGPS positioning in the case of a predefined real-time positioning situation, using a GPS signal received from GPS satellites and data received from a PDE of a mobile communication system; and a display part displaying location information generated as a result of positioning in the radiodetermination device.

In one embodiment, wherein the radiodetermination device comprises, a PM determination part determining a positioning mode corresponding to a specific situation from positioning modes comprising a stand-alone GPS positioning mode and an AGPS positioning mode, in the case the specific situation occurs; and a PI generating part generating location information by performing a stand-alone GPS positioning for each pre-determined period in the case the determined positioning mode is the stand-alone GPS positioning mode, and generating location information by performing a real time AGPS positioning in the case the determined positioning mode is the AGPS mode, wherein the PM determination part determines the positioning mode corresponding to the periodic positioning situation as the stand-alone GPS positioning mode in the case of the predefined periodic positioning situation, and determines the positioning mode corresponding to the real-time positioning situation as the AGPS positioning mode in the case of the predefined real-time positioning situation.

A radiodetermination method, according to another embodiment of the present disclosure, performing a radiodetermination through a radiodetermination apparatus comprising a GPS signal reception part and a wireless communication part comprises the steps of determining a positioning mode corresponding to a specific situation from positioning modes of a cell ID positioning mode, a stand-alone GPS positioning mode and an AGPS positioning mode in the radiodetermination apparatus, in the case the specific situation occurs; and generating position information by performing a cell ID positioning for a predetermined first period or in real-time in the case of the cell ID positioning mode, generating location information by performing a stand-alone GPS positioning for a predetermined second period in the case of the stand-alone GPS positioning mode, and generating location information by performing a real-time AGPS positioning in the case of the AGPS positioning mode.

DETAILED DESCRIPTION OF THE DISCLOSURE

Figure 1:
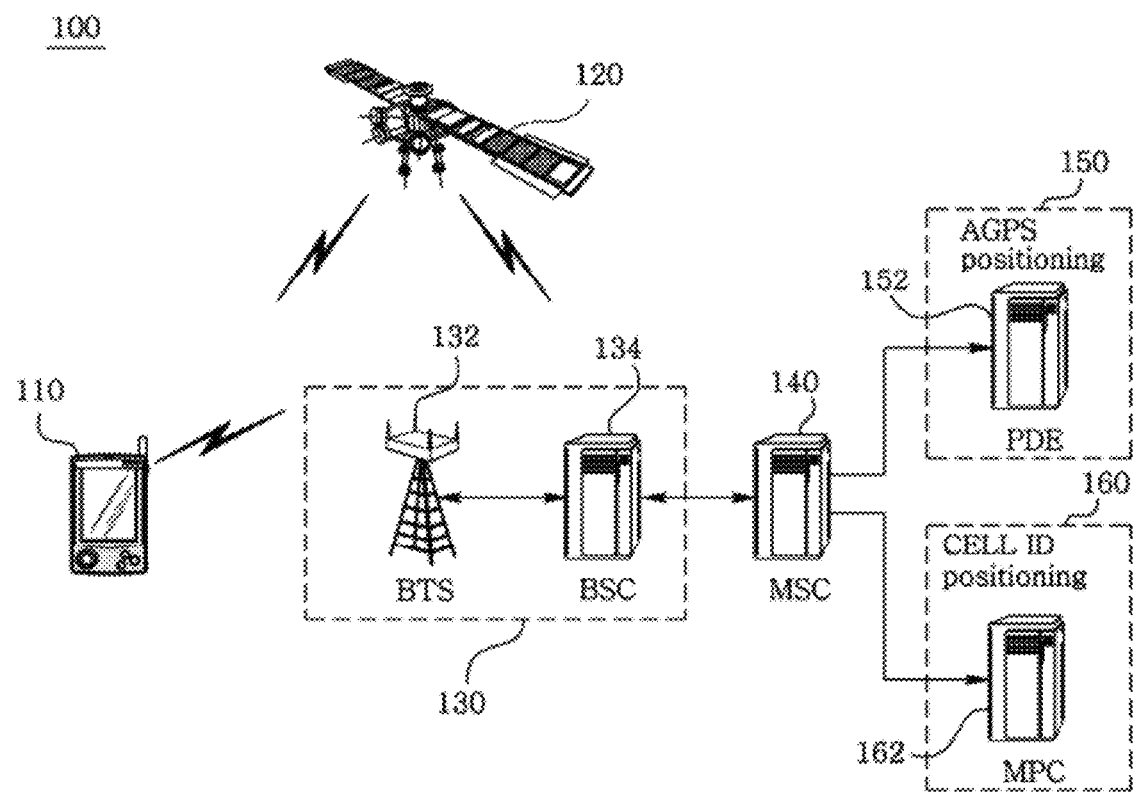
FIG. 1 is a diagram indicating a mobile communication system environment applicable with embodiments of the disclosure.

Hereinafter, a preferred embodiment of the disclosure will be described in consideration of the annexed drawings. The size and shape of components shown in the drawings during this procedure may be exaggerated or simplified for the sake of description's clarity and conveniences. Also, specially defined terms in consideration of the construction and function of the present disclosure may be varied according to the intention and custom of users and operators. Such terms-related definition should be made based on recitations throughout the entire specification.

FIG. 1 shows a mobile communication network environment applicable with embodiments of the disclosure.

As illustrated in FIG. 1, the mobile communication network environment 100 include a mobile terminal 110, a GPS satellite 120, a base station 130, an MSC (Mobile Switching Center) 140, and a network based positioning system 150, 160.

The mobile terminal 110 include a radiodetermination device and a display part to perform a radiodetermination. For example, the radiodetermination device performs a stand-alone GPS positioning for a predetermined period in case of a predetermined periodic positioning situation or performs real-time AGPS (Assisted GPS) positioning in case of a predefined real-time positioning situation, using a GPS signal received from a GPS satellite 120 and data received from a position determination entity (PDE) 152 of a mobile communication system. And, the display part displays position information generated from a determination result of the radiodetermination device to be possibly recognized by a user.

In one embodiment, the radiodetermination device includes a positioning mode determination part and a position information generating part. The positioning mode determination part determines a positioning mode corresponding to a specific situation from positioning modes comprising a stand-alone GPS positioning mode and an AGPS positioning mode, in a case the specific situation occurs. And, the location information generating part generates location information by performing a stand-alone GPS positioning for a predetermined period in the case of the stand-alone GPS positioning mode, or generates location information by performing a real time AGPS positioning in the case of the AGPS positioning mode. In this case, the positioning mode determination part may determine a positioning mode corresponding to a periodic positioning situation as the stand-alone GPS mode in case of a predetermined periodic location determination situation and determine a positioning mode corresponding to a real-time positioning situation as the AGPS positioning mode in case of a predetermined real-time location determination situation.

On the one hand, the GPS satellite 120 is a satellite used to grasp the position of the mobile terminal 110 in a GPS (Global Positioning System). For example, The GPS satellite 120 consists of 24 satellites continuously transmitting navigating data needed for position calculation to the mobile terminal 110 using a carrier wave, of these 21 satellites are used for navigation and 3 satellites are placed for preliminary used.

BTSs (Base Transceiver Station) 132 of the base station 130 are equipment composed of radio transceivers, and transmit/receive voice call and packet data via radio links to/from a mobile terminal 110 within a RAN (Radio Access Network). And, a BSC (Base Station Controller) 134 of the base station 130 manage a multiple of base transceiver stations 132 and serve as a radio channel setup, frequency hopping, handover processing and the like.

An MSC (Mobile Switching Center) 140 is in charge of mobility management, position registration/management, authentication, handover and roaming of the mobile terminal 110.

A PDE (Position Determination Entity) 152 of the network based positioning system 150, 160 included in a mobile communication system calculates latitude/longitude information using GPS information transmitted from the mobile terminal 110.

An MPC (Mobile Positioning Center) 162 of the network based positioning system 150, 160 processes a cell-ID type positioning through the mobile switching center 140 in case of failing a GPS positioning of the mobile terminal 110 and transmits base station cell information for the mobile terminal 110 to the mobile terminal 110, etc.

In the following, embodiments of the disclosure will be specifically described referencing to FIGS. 2 and 3.

Figure 2:
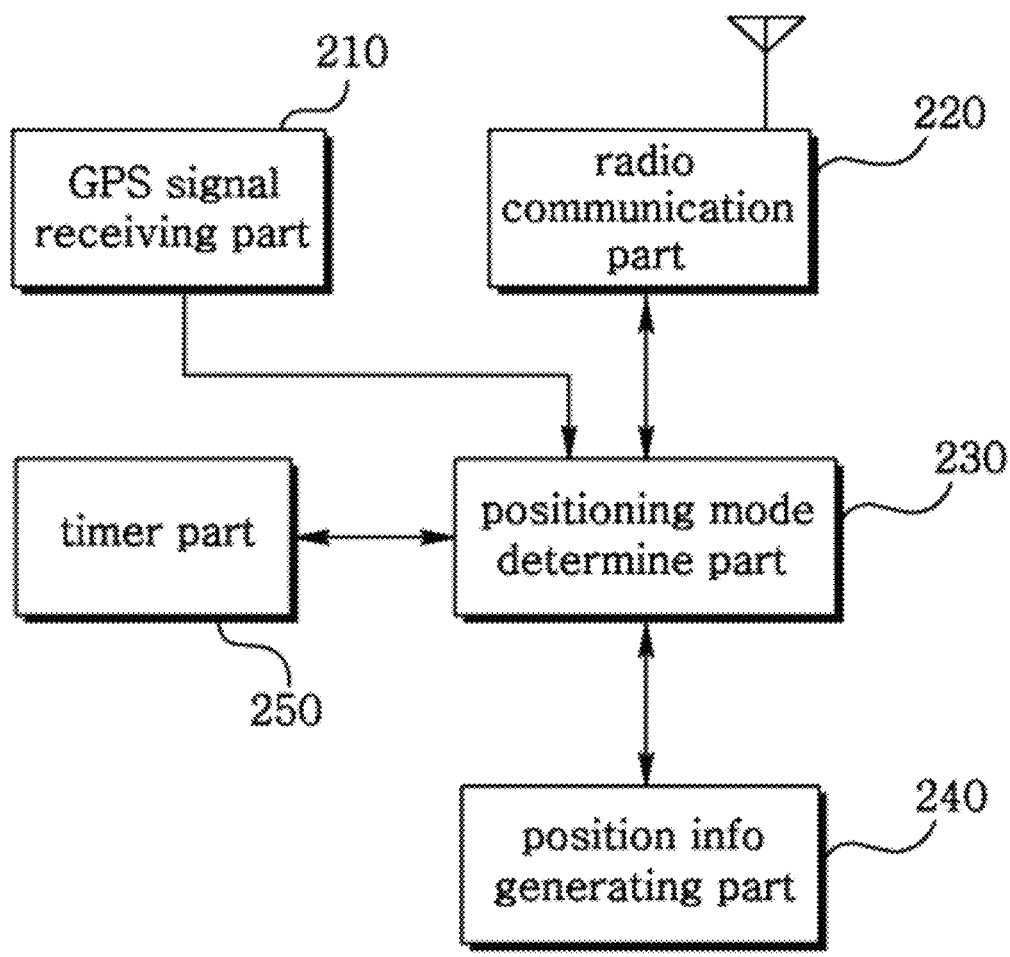
FIG. 2 is a block diagram indicating a radiodetermination apparatus according to one embodiment of the disclosure.

FIG. 2 shows a block diagram of a radiodetermination device, according to one embodiment of the disclosure. In addition, FIG. 3 shows a flow diagram of a radiodetermination method, according to one embodiment of the disclosure.

Figure 3:
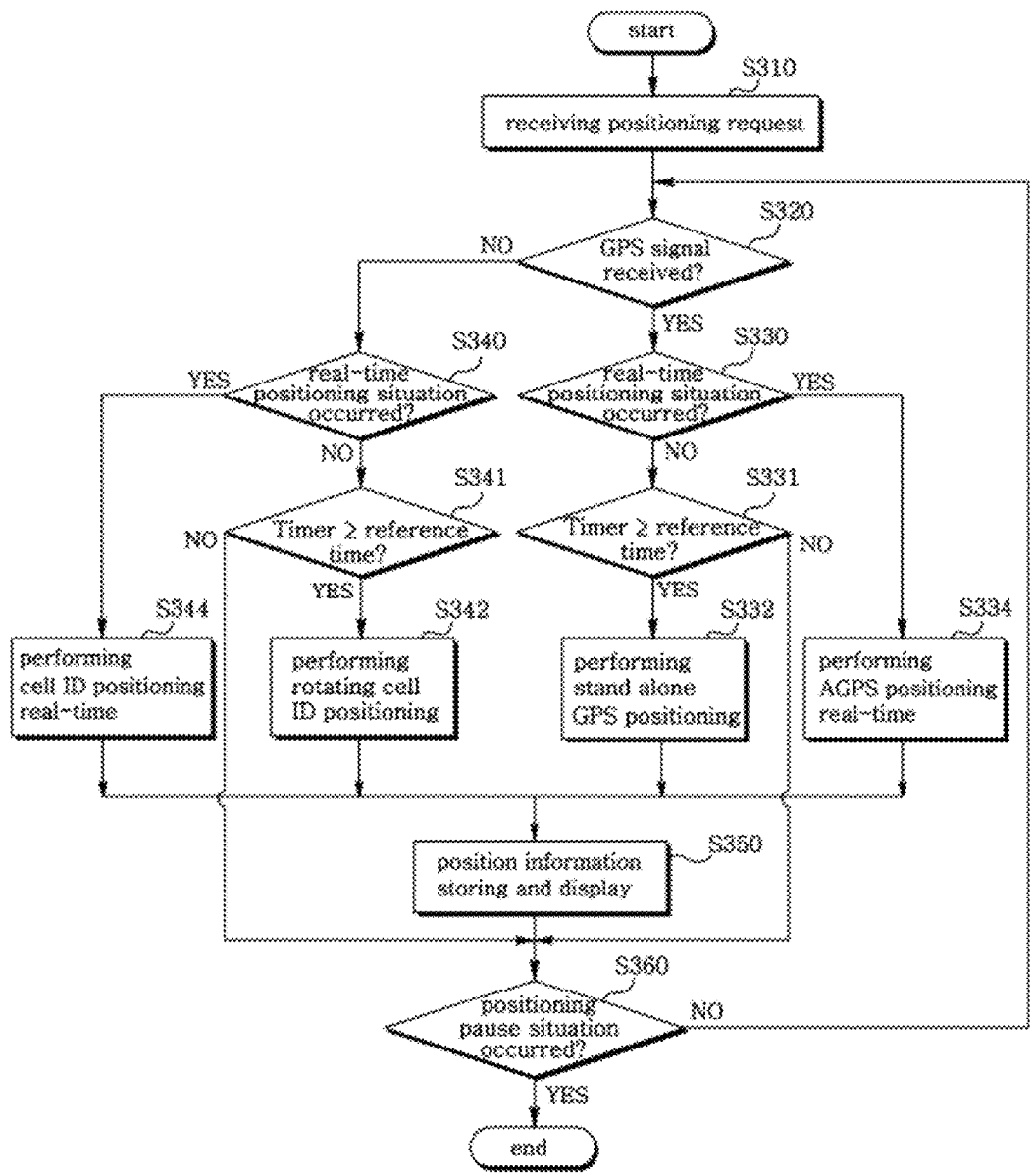
FIG. 3 is a flow diagram indicating a radiodetermination method according to one embodiment of the present disclosure.

As shown in FIGS. 2 and 3, the radiodetermination device 100 comprises a positioning mode determination part 230 and a location information generating part 240.

First, when radiodetermination device 100 receives a positioning request is by a configuration of a mobile terminal with the radiodetermination device 100, or a key input or menu selection of a user, the radiodetermination device 100 starts a positioning (S310).

And, the positioning mode determination part 230 determines a positioning mode corresponding to a specific situation from positioning modes containing a stand-alone GPS positioning mode and an AGPS (Assisted GPS) positioning mode, in a case the specific situation occurs (S320, S330, S340).

The next, the location information generating part 240 generates location information by performing a stand-alone GPS positioning for a predetermined period in the case of the stand-alone GPS positioning mode, or generates location information by performing real time AGPS positioning in case of the AGPS positioning mode (S331, S332, S334). In this case, AGPS positioning performed by the location information generating part 240 may be an MS assisted GPS positioning or an MS based GPS positioning.

The stand-alone GPS positioning mode may be a mode of receiving satellite orbiting information of 1.5 gigahertz frequency band at a low transfer rate such as 2,400 to 4,800 bit per second from three of 24 GPS man-made satellites rotating the Earth orbit in the height of 20,000 kilometers, grasping location information such as latitude, longitude and altitude by triangulation, and also catching time information by additionally receiving one satellite signal and analyzing. The stand-alone GPS positioning mode, having an error range of a degree of several meters to several tens of meters, is advantageously relatively precise, but in the downside it takes a long positioning time, for example TTFF (Time To First Fix), an actual consumption time up to receive and decode signals at low transfer rate and to apply, requires more than around 1 minute to several tens of minutes.

Thus, the positioning mode determination part 230 determines a positioning mode corresponding to a periodic positioning situation as the stand-alone GPS positioning mode in a case a predetermined periodic positioning situation occurs, for example, in case a normal situation occurs, e.g., a mobile terminal with the radiodetermination apparatus 100 starts a booting to exist on a mobile communication network or in a call stand-by state, and besides there is no special event (S330). Then, the position information generating part 240 performs the stand-alone GPS positioning using a GPS signal received from GPS satellites (S331, S332). In this case, the position information generating part 240 performs the stand-alone GPS positioning for a predefined period for energy efficiency. For this, the radiodetermination apparatus 100 comprises a GPS signal receiving part 210 receiving a GPS signal from GPS satellites. Also, it further comprises a timer 250 counting the predefined period. Also, a period for performing a positioning may be determined considering an environment where the radiodetermination apparatus 100 is applied. For instance, when in a mini mobile terminal environment using a battery of 520 mAh capacity, 520 mA is consumed in a call attempt and about 30 seconds is taken for a positioning time, a positioning period may be determined as around 12 minutes to maintain stand-by time for over 24 hours.

In addition, the AGPS positioning mode may be divided into a MS-assisted network-based GPS mode, that is, MS assisted GPS mode, and a MS-based network-based GPS mode, that is MS based GPS mode. The MS assisted GPS mode and the MS based GPS mode is a mode of receiving an aiding data transmitted from a position determination entity (PDE) of a mobile communication system to calculate or compute location information of a mobile station (MS), and analyzing a GPS signal received from one or more GPS satellites to compute location information.

In particular, the MS assisted GPS mode is a mode of transmitting GPS information received by a mobile terminal to a mobile communication system, calculating a final location based on the GPS information by a position determination entity (PDE) of the mobile communication system and a search result on dispersion information of GPS satellites previously recognized, and transferring it to the mobile terminal.

Also, the MS-based GPS mode is a mode of receiving an aiding data of GPS satellites from a position determination server (PDE) of a mobile communication system, and receiving and self computing a GPS signal from an assigned GPS man-made satellite for a very short TTFF by the aiding data such provided, and generating location information such as latitude, longitude and altitude of a current position. In this case, the aiding data is necessary information to be precedingly procured in a location confirm type using GPS satellites, and indicates ALMANAC information representing orbit information of GPS satellites and EPHEMERIS information representing flight speed or motion velocity information of GPS satellites.

Therefore, the positioning mode determination part 230 determines a positioning mode corresponding to the real-time positioning situation as the AGPS positioning mode in case a predefined real-time positioning situation occurs, for example an emergency affair occurs, e.g., a battery of a mobile terminal with the radiodetermination apparatus 100 is almost to be discharged or an urgent call request to another mobile terminal fails, there is a real-time position query request by a user, or if there is other special events (S330). Then, the position information generating part 240 performs the AGPS positioning using the GPS signal received from GPS satellites and data of a position determination server (PDE) in a mobile communication system (S334). In this case, the position information generating part 240 performs the AGPS positioning in real-time for providing location information speedily and precisely. To do this, the radiodetermination apparatus 100 may include a radio communication part 220 performing communication with a mobile communication system having the position determination server (PDE). Also as described in the above, the position information generating part 240 can generate location information by performing MS assisted GPS positioning or performing MS based GPS positioning according to embodiments.

On the one hand, the stand-alone GPS positioning mode or the AGPS positioning mode require a GPS signal necessarily. As a result, in case a radio communication environment is deteriorated, e.g., the number of GPS satellites is lacked, in a bad weather or placed in indoors or a basement, it is impossible for a normal operation of a radiodetermination apparatus.

Thus, in one embodiment, the positioning mode determination part 230 may determine a positioning mode corresponding to the specific situation from positioning modes comprising a cell ID positioning mode, stand-alone GPS positioning mode and AGPS (Assisted GPS) positioning mode, in a case the specific situation occurs (S320, S330, S340).

The next, the position information generating part 240 may generate location information by performing a cell ID positioning for a predetermined first period or in real-time when the determined positioning mode is the cell ID mode, generate location information by performing a stand-alone GPS positioning for a predetermined second period in the case of the stand-alone GPS positioning mode, or generates location information by performing a real time AGPS positioning in the case of the AGPS positioning mode (S331, S332, S334, S341, S342, S344).

In one embodiment, the positioning mode determination part 230 determines a positioning mode corresponding to the failure situation as the cell ID positioning mode in case a failure situation of a GPS signal reception by the GPS signal reception part 210 occurs (S320).

Also, the positioning mode determination part 230 determines the cell ID positioning mode as a periodic cell ID positioning mode in case of a predefined periodic positioning situation in the cell ID positioning mode state, for example, in case failing in a GPS signal reception but there is no other special event (S340). And, the position information generating part 240 performs a cell ID positioning for the first period using data of a mobile positioning center (MPC) received through the mobile communication part 220 (S341, S342). In this case, the position information generating part 240 may count the first period using the timer 250. Also, the radiodetermination apparatus 100 may comprise an additional radio communication part performing communication with a mobile communication system having the mobile switching center (MPC).

Also, the positioning mode determination part 230 determines the cell ID positioning mode as a real-time cell ID positioning mode in case of a predefined real-time positioning situation in the cell ID positioning mode state, for example in a failed state of a GPS signal reception, an emergency affair occurs, e.g., a battery of a mobile terminal with the radiodetermination apparatus 100 is almost to be discharged or an urgent call request to another mobile terminal fails, there is a real-time position query request by a user, or if there is other special events (S340). And, the positioning information generating part 240 performs a cell ID positioning in real-time using data of a mobile positioning center (MPC) of a mobile communication system received through the radio communication part 220 (S344).

The next, location information generated by the radiodetermination apparatus 100 may be stored in a given storage (not shown) or displayed in a recognizable form through a given display part (not shown) (S350). The storage part and the display part may be included in the radiodetermination part 100, or contained in a mobile terminal with the radiodetermination part 100.

And, the radiodetermination part 100 generates location information by the above-described actions in while a given positioning pause condition, for example electric power is off, or a positioning pause request by a user is received, is not occurred (S360).

Herein, embodiments of the disclosure can be realized in a way of recording a computer readable program code on computer readable recording media. In a case embodiments of the disclosure is executed using software, components of the present disclosure are code segments running necessary tasks. Also, a program or code segments may be stored in a medium readable by a processor of computers or may be transmitted using a computer data signal combined with carrier waves via transmission media or communication networks.

Computer readable recording media may include various kinds of recording devices storing data possibly to be read by a computer system. For example, computer readable recording media may include a ROM, a RAM, a CD-ROM, a magnetic tape, a floppy disk, and an optic data storage device. In addition, a computer system connected with a network may be distributing disposed with computer readable recording media that computer readable codes can be stored in a divided way and thus executed.

As described above, embodiments of the disclosure may consider accuracy and speed of position measurements and also improve energy efficiency, configured by selecting an adaptive positioning determination mode according to situation change in a resource-limitive mobile terminal environment. Also, embodiments of the present disclosure may further improve user conveniences by allowing position measurements in a painful environment of GPS signal reception.

While the present disclosure has been described in detail through representative exemplary embodiments in the above part, these only representing exemplary ones, it would be understand by those skilled in the art that various modifications can be made in the described embodiment without departing from the scope of the present disclosure. Therefore, the scope of the present disclosure rights should be defined by the accompanying claims and its equivalents.

What is claimed is:

1. A radiodetermination apparatus, comprising:
    a GPS signal receiving part receiving a GPS signal from GPS satellites;
    a PM determination part configured to determine a positioning mode corresponding to a specific situation from positioning modes of a Cell ID positioning mode, a stand-alone GPS positioning mode and an AGPS positioning mode when the specific situation occurs; and
    a PI generating part configured to:
    generate location information by performing a cell ID positioning for a predetermined first period or in real-time according to whether the specific situation is a predefined periodic positioning situation or a predefined real-time positioning situation in the case of the cell ID positioning mode,
        generate location information by performing a stand-alone GPS positioning for a predetermined second period in the case of the stand-alone GPS positioning mode, and
        generate location information by performing a real-time AGPS positioning in the case of the AGPS positioning mode, wherein the PM determination part determines the positioning mode corresponding to a failure situation as the cell ID positioning mode when the GPS signal is not received by the GPS signal reception part.

2. The apparatus of claim 1, further comprising a wireless communication part configured to perform communication with a mobile communication system having an MPC (Mobile Positioning Center), wherein the PM determination part determines the cell ID positioning mode as a periodic cell ID positioning mode in the case of the predefined periodic positioning situation in the cell ID positioning mode state, and the PI generating part performs the cell ID positioning for the first period using data of the MPC received via the wireless communication part.

3. The apparatus of claim 2, wherein the PM determination part determines the cell ID positioning mode as a real-time cell ID positioning mode in the case of the predefined real-time positioning situation in the cell ID positioning mode state, and the PI generating part performs the cell ID positioning in real-time using data of the MPC received via the wireless communication part.

4. The apparatus of claim 1, wherein the PM determination part determines a positioning mode corresponding to the periodic positioning situation as the stand-alone GPS positioning mode in the case of the predefined periodic positioning situation.

5. The apparatus of claim 4, wherein the PM determination part determines a positioning mode corresponding to the real-time positioning situation as the AGPS positioning mode in the case of the predefined real-time positioning situation.

6. The apparatus of claim 1, further comprising a GPS signal receiving part receiving a GPS signal from GPS satellites, wherein the PI generating part performs the stand-alone GPS positioning using the received GPS signal.

7. The apparatus of claim 6, further comprising a wireless communication part performing communication with a mobile communication system having a PDE, wherein the PI generating part performs the AGPS positioning in real-time using data of the PDE received via the wireless communication part.

8. The apparatus of claim 7, wherein the AGPS positioning performed by the PI generating part is an MS assisted GPS positioning or an MS (Mobile Station) based GPS positioning.

9. A radiodetermination method performing a radiodetermination through a radiodetermination apparatus comprising a GPS signal reception part and a wireless communication part, said method comprising:
    determining a positioning mode corresponding to a specific situation from positioning modes of a cell ID positioning mode, a stand-alone GPS positioning mode and an AGPS positioning mode in the radiodetermination apparatus when the specific situation occurs; and
    generating position information by performing a cell ID positioning for a predetermined first period or in real-time according to whether the specific situation is a predefined periodic positioning situation or a predefined real-time positioning situation in the case of the cell ID positioning mode, generating location information by performing a stand-alone GPS positioning for a predetermined second period in the case of the stand-alone GPS positioning mode, and generating location information by performing a real-time AGPS positioning in the case of the AGPS positioning mode, wherein the cell ID positioning mode is determined as the positioning mode corresponding to a failure situation when the GPS signal is not received by the GPS signal reception part.

10. The method of claim 9, wherein the determining comprises determining the cell ID positioning mode as a periodic cell ID positioning mode in the case of the predefined periodic positioning situation in the cell ID positioning mode state, and
    the generating comprises performing the cell ID positioning for the first period using data of the MPC received via the wireless communication part from the mobile communication system.

11. The method of claim 9, wherein the determining comprises determining the cell ID positioning mode as a real-time cell ID positioning mode in the case of the predefined real-time positioning situation in the cell ID positioning mode state, and
    the generating comprises performing the cell ID positioning in real-time using data of the MPC received via the wireless communication part from the mobile communication system.

12. The method of claim 9, wherein the determining comprises determining a positioning mode corresponding to the periodic positioning situation as the stand-alone GPS positioning mode in the case of the predefined periodic positioning situation.

13. The method of claim 9, wherein the determining comprises determining a positioning mode corresponding to the real-time positioning situation as the AGPS positioning mode in the case of the predefined real-time positioning situation.

14. The method of claim 9, wherein the generating comprises performing the stand-alone GPS positioning using GPS signal received from GPS satellites via the GPS signal reception part.

15. The method of claim 9, wherein the generating comprises performing the AGPS positioning using data of the PDE received from the mobile communication system via the wireless communication part.

* * * * *